(12) United States Patent
Liu et al.

(10) Patent No.: US 10,893,418 B2
(45) Date of Patent: Jan. 12, 2021

(54) AP DEPLOYMENT IN A NETWORK COMPRISING A CENTRALIZED SYSTEM AND A DISTRIBUTED SYSTEM

(71) Applicant: Hewlett Packard Enterprise Development LP, Houston, TX (US)

(72) Inventors: Hsiu-Wei Liu, Santa Clara, CA (US); Jikui Pei, Beijing (CN); Ben Dunsbergen, San Jose, CA (US); Rajini Balay, Santa Clara, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/915,723

(22) Filed: Mar. 8, 2018

(65) Prior Publication Data

US 2019/0281472 A1    Sep. 12, 2019

(51) Int. Cl.
*H04W 16/18* (2009.01)
*H04L 12/24* (2006.01)
*H04L 29/12* (2006.01)
*H04W 84/12* (2009.01)
*H04W 88/08* (2009.01)

(52) U.S. Cl.
CPC ......... *H04W 16/18* (2013.01); *H04L 41/0806* (2013.01); *H04L 41/0893* (2013.01); *H04L 61/2015* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 7,406,711 B2* | 7/2008 | Fuchs | ................ | G06F 11/0745 713/172 |
| 8,078,906 B2* | 12/2011 | Yochai | ................ | G06F 11/2028 714/6.3 |
| 8,248,923 B2* | 8/2012 | Czaja | ................ | H04L 41/0806 370/229 |
| 8,284,752 B2* | 10/2012 | Ketchum | ................ | H04L 29/06 370/349 |

(Continued)

OTHER PUBLICATIONS

Aruba AP-215 Access Point, (Web Page), Aug. 5, 2014, 3 Pgs.

(Continued)

*Primary Examiner* — Gregory B Sefcheck
(74) *Attorney, Agent, or Firm* — Brooks, Cameron & Huebsch, PLLC

(57) ABSTRACT

Embodiments are directed to access point deployment in a network including a centralized system and a distributed system. An embodiment of an apparatus includes a memory and a processor executing instructions stored in the memory. The instructions include instructions to receive a message from an access point (AP) requesting a role in a network and, based on reception of the message, to access a deployment policy. The instructions further include instructions to determine whether the deployment policy is defined for the AP and, based on a determination that the deployment policy is defined for the AP, to assign the role to the AP corresponding to the deployment policy and corresponding to at least one of a centralized system or a distributed system of the network.

8 Claims, 6 Drawing Sheets

(56) References Cited

U.S. PATENT DOCUMENTS

| | | | | |
|---|---|---|---|---|
| 8,699,379 | B2* | 4/2014 | Kholaif | H04W 48/20 |
| | | | | 370/254 |
| 8,756,298 | B2* | 6/2014 | Ma | H04L 67/1031 |
| | | | | 709/221 |
| 8,819,778 | B2* | 8/2014 | Du | H04L 63/205 |
| | | | | 726/3 |
| 8,934,906 | B2* | 1/2015 | Pan | H04W 36/0009 |
| | | | | 455/436 |
| 8,955,038 | B2* | 2/2015 | Nicodemus | G06F 21/577 |
| | | | | 726/1 |
| 9,131,473 | B2* | 9/2015 | Wang | H04L 41/28 |
| 9,137,171 | B2* | 9/2015 | Koodli | H04L 45/308 |
| 9,398,471 | B2* | 7/2016 | Iyer | H04W 24/02 |
| 9,510,263 | B2* | 11/2016 | Pan | H04W 36/0055 |
| 9,553,668 | B2* | 1/2017 | Laraqui | H04W 24/02 |
| 9,681,365 | B2* | 6/2017 | Gupta | H04W 48/16 |
| 9,756,505 | B1* | 9/2017 | Jiang | H04L 63/083 |
| 9,769,871 | B2* | 9/2017 | Giloh | H04L 45/54 |
| 9,912,635 | B2* | 3/2018 | Dhulipala | H04L 61/2015 |
| 10,165,608 | B2* | 12/2018 | Grayson | H04W 76/11 |
| 10,609,626 | B2* | 3/2020 | Lin | H04L 12/283 |
| 2005/0257039 | A1* | 11/2005 | Marshall | H04L 63/0272 |
| | | | | 713/1 |
| 2006/0253570 | A1* | 11/2006 | Biswas | H04L 41/0816 |
| | | | | 709/224 |
| 2008/0262901 | A1* | 10/2008 | Banga | G06Q 10/06375 |
| | | | | 705/14.53 |
| 2009/0086639 | A1* | 4/2009 | Krzanowski | G06F 15/16 |
| | | | | 370/241 |
| 2009/0141694 | A1 | 6/2009 | Shi | |
| 2011/0142017 | A1* | 6/2011 | Coldren | H04L 12/2801 |
| | | | | 370/338 |
| 2014/0334336 | A1 | 11/2014 | Chen et al. | |
| 2015/0365911 | A1 | 12/2015 | Mohandas et al. | |
| 2017/0026335 | A1 | 1/2017 | Dhulipala et al. | |
| 2019/0116504 | A1* | 4/2019 | Rusackas | H04L 41/22 |

OTHER PUBLICATIONS

D-Link DWS-3160-24PC Gigabit Switch—24-Port 10/100/1000, 4-Port Combo SFP, QoS, L2 Managed, Rackmountabie, (Web Page), Feb. 16, 2012, 4 Pgs.

HP Unified controller—Local forwarding—with VLAN assignment, (Web Page), Oct. 24, 2014, 6 Pgs.

NXC5500/2500, (Research Paper), Feb. 26, 2017, 22 Pgs.

Unifi UAP on Separate Management Subnet, (Web Page), Jan. 6, 2015, 3 Pgs.

Unified Wireless: Controller Managed Access Points, (Web Page), May 21, 2015, 3 Pgs.

Yang et al., "Architecture Taxonomy for Control and Provisioning of Wireless Access Points(CAPWAP) draft-ieff-capwap-arch-01", Apr. 5, 2004, pp. 1-89.

European Search Report received for EP Application No. 19157870.7, dated Jun. 11, 2019, 14 pages.

Calhoun et al., "Control and Provisioning of Wireiess Access Points (CAPWAP) Protocol Specification," Network Working Group, Request for Comments: 5415, Category: Standards Track, Mar. 2009, pp. 1-155.

* cited by examiner

AP DEPLOYMENT IN A NETWORK COMPRISING A CENTRALIZED SYSTEM AND A DISTRIBUTED SYSTEM

BACKGROUND

Systems and devices can comprise access points (APs) to connect user devices to a network. The network can be a local area network (LAN). The network can comprise a centralized system comprising multiple APs and user devices.

DETAILED DESCRIPTION

Figure 1:
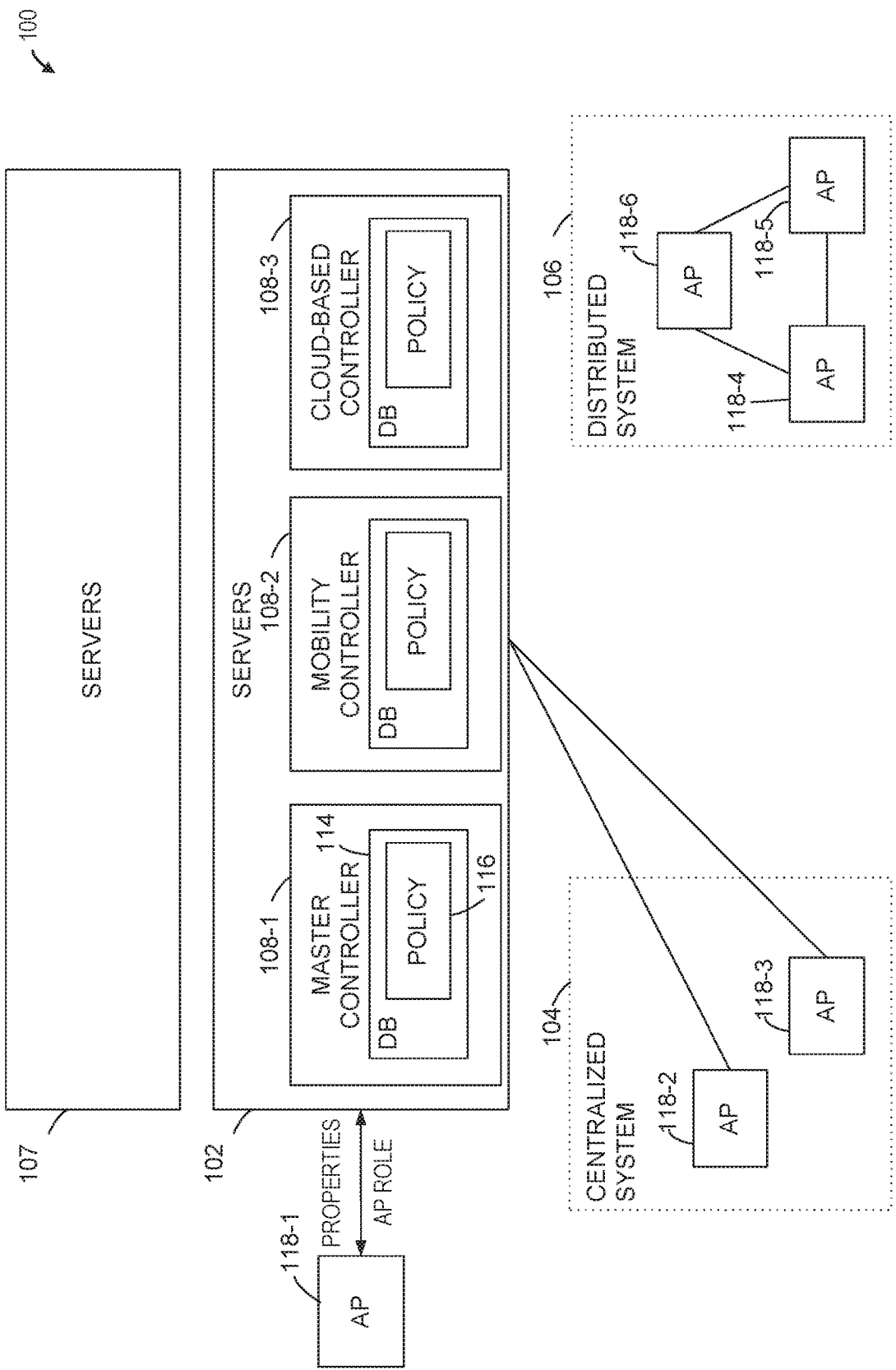
FIG. 1 illustrates an example of a network for deploying an AP consistent with the disclosure.

An access point (AP) may be deployed to a network environment. The AP may be deployed to a network without active configurations for a centralized system of the network or a distributed system of the network, and later provisioned as an AP in the centralized system or the distributed system after joining the network. In a number of examples, a controller of the network can assign an AP role to the AP to instruct the AP to function in the centralized system and/or the distributed system of the network. The AP can activate functionalities consistent with the AP role.

As used herein, a network and a network environment can describe a wireless network such as a wireless local area network (WLAN), among other types of wireless networks. The network can include a mixed WLAN infrastructure in a same layer 2 network or a single WLAN infrastructure. For example, the network can include multiple systems. In some examples, the network can include at least two different systems. The network can include a centralized system and/or a distributed system. The centralized system and the distributed system of the network can be referred to as a centralized network and a distributed network of the network, respectively.

The centralized system manages, allocates, and/or controls network resources from a main location. That is, the centralized system can manage and/or control network resources from a centralized point comprising multiple computing devices. The centralized system can utilize a client-server model through which network resources and/or data passes. The network resources can include APs, among other network resources. In some examples, the centralized system can comprise a portion of a network in which the APs are coupled to a central server which is the acting agent for communications. The central server can manage and/or control the AP. The central server can be referred to as a controller.

A distributed system can provide connectivity using multiple access points without a central server. Within a distributed system, APs may be assigned different roles. An AP can be a main base station, a relay base station, and/or a remote base station, among other roles that an AP can assume within a distributed system of a network. A main base station can provide a wired connection to the Ethernet. A relay base station can relay data between the remote base station and the main base station. In some examples, the relay base station can relay data to other relay base stations. The remote base station can accept connections from user devices and pass received data to relay base stations and/or the main base station.

As used herein, an AP comprises hardware and software to connect a device to a wired network utilizing a wireless service such as WLAN. An AP can function in a controller-based mode and/or in a controller-less mode. In a controller-based mode, the AP can function as a controller-based AP. A controller-based AP can communicate with a controller. In a controller-less mode, the AP can function as a controller-less AP. A controller-less AP can function without communicating with a controller. The controller-based AP can define a device configured for a centralized system. The controller-less AP can define a device configured for a distributed system. As such, an AP functioning in a controller-based mode can function in a centralized system and an AP functioning in a controller-less mode can function in a distributed system.

An AP that is initially introduced to a network comprised of a centralized system or a distributed system may not include activated functionalities to function within the network. Said differently, the AP may not include activated functionalities to function within a centralized system or a distributed system of the network. It may be useful to determine whether the AP is to function within a centralized system or a distributed system of the network after deploying the UAP to a particular network. In some examples, the AP may learn an AP role through interacting with a network environment using a dynamic host configuration protocol (DHCP), a domain name server (DNS) protocol, and/or a discover protocol (e.g., Aruba discovery protocol (ADP)), etc. The AP can attach to a corresponding management entity and activate the set of software features corresponding to the particular network that the UAP is deployed at (e.g., either the centralized system or the distributed system). For example, the AP can attach to a management entity of the centralized system and activate features corresponding to the centralized system or the AP can attach to a management entity of the distributed system and activate features corresponding to the distributed system.

In some examples, the AP can be deployed to a mixed network comprising both a centralized system and a distributed system in a layer 2 network. It may be undesirable to change the network environment such as the DHCP and/or the DNS to provide the AP access to a given AP role given that changing the network environment may affect other APs in the same network. For example, it may be undesirable to program the DNS at a first point in time to provide an AP access to an AP role and program the DNS at a second point in time to provide a different AP access to a different AP role.

In some examples, the AP role can be assigned to allow the AP to function in both the centralized system and the distributed system without configuring the DHCP, the DNS, and/or the ADP. The AP role of a given AP can be defined in a deployment policy which may be accessible to a controller of the centralized system. The deployment policy may be independent of the DHCP, the DNS, and/or the ADP which may provide an assignment or reassignment of an AP role without changes to the DHCP, the DNS, and/or the ADP.

The deployment policy can include a mapping between properties of APs and systems of the network. For example, a deployment policy can include a plurality of ranges of properties. The plurality of ranges of properties can be associated with different types of property. For example, a first type of property of an AP policy can be associated with a first range of properties and a second range of properties, a second type of property of the AP can be associated with a third range of properties. Each of the ranges of properties can be associated with the systems of the network (e.g., centralized system and/or distributed system). In some examples, some of the ranges of properties are not associated with the systems of the network.

The figures herein follow a numbering convention in which the first digit corresponds to the drawing figure number and the remaining digits identify an element or component in the drawing. For example, reference numeral 104 may refer to element "04" in FIG. 1 and an analogous element may be identified by reference numeral 204 in FIG. 2. Elements shown in the various figures herein can be added, exchanged, and/or eliminated to provide a number of additional examples. In addition, the proportion and the relative scale of the elements provided in the figures are intended to illustrate the examples described, and should not be taken in a limiting sense.

FIG. 1 illustrates an example of a network 100 for deploying an AP 118-1 consistent with the disclosure. The network 100 includes the servers 102, the centralized system 104, the distributed system 106, and the servers 107. The centralized system 104 can include a number of APs including an AP 118-2 and an AP 118-3. The distributed system 106 can also include a number of APs including an AP 118-4, an AP 118-5, and an AP 118-6. The APs 118-1 to 118-6 can collectively be referred to as APs 118.

In some examples, upon activating the AP 118-1, the AP 118-1 can discover the servers 107. Upon discovering the servers 107, the AP 118-1 can request a pointer. The requested pointer can be to a device and/or a component that can provide an AP role. As such, the servers 107 can provide a pointer to a server from the servers 102 or multiple of the servers 102.

The servers 107 can include hardware and/or software that contribute to the network environment. For example, the servers 107 can include a DHCP server, a DNS, and/or an ADP server, among other types of servers and/or protocols that can comprise a network environment. In some examples, the servers 107 can point to the servers 102. For example, a DHCP can return an option 60 and/or an option 43 pointing to an address of the controllers 108.

The servers 102 can comprise hardware and software to manage and/or control the resources of the centralized system 104. The servers 102 can include a controller or multiple controllers. For example, the servers 102 include at least one of a master controller 108-1, a mobility controller 108-2, and a cloud-based controller 108-3, referred to generally as controllers 108.

In the examples described herein references to the controllers 108 can include references to the master controller 108-1, the mobility controller 108-2, and/or the cloud-based controller 108-3. For example, an action described as being performed by the controllers 108 can reference an action performed by the mobility controller 108-2.

The mobility controller 108-2 can comprise hardware and/or software to manage and/or control the resource of the centralized system 104. The master controller 108-1 can manage and/or control a cluster of mobility controllers and can be part of the centralized system 104. The cloud-based controller 108-3 can comprise hardware and/or software to support AP deployment. As such, the cloud-based controller 108-3 can be referred to as a deployment controller.

The inclusion of the master controller 108-1, the mobility controller 108-2, and the cloud-based controller 108-3 in servers 102 and the network 100 is provided for illustrative purposes. The network 100 can comprise a greater or a0 lesser number of controllers than those shown in FIG. 1. The network 100 can also comprise different types of controllers than those described herein.

Each of the controllers 108 can comprise a deployment policy 116. The deployment policy 116 can define a policy for assigning APs to the centralized system 104 and/or the distributed system 106. The deployment policy 116 can associate identifiers (IDs) of APs and/or properties of APs with systems (e.g., centralized system 104 and/or distributed system 106) of the network 100. A property of the AP 118-1 can include an internet protocol (IP) address, a media access control (MAC) address of the AP 118-1, and/or a group association of the AP 118-1, among other properties of the AP 118-1.

In some examples, the deployment policy 116 can define ranges of the properties of the APs 118 and associate the given ranges of the properties with a centralized system 104 and/or a distributed system 106. For example, the deployment policy 116 can define that a first range of IP addresses of the network 100 can be deployed to a centralized system 104. The deployment policy 116 can also define a first range of IP addresses and a second range of IP addresses of the network 100. The deployment policy 116 can associate the first range with the centralized system 104 and/or the second range of IP addresses with the distributed system 106 of the network 100.

The controllers 108 can compare a property of the AP 118-1 with the ranges of the property(s) of the APs to determine an associated system. The controller 108 can then assign an AP role based on the identified system.

In some examples, the AP role can describe the inclusion of an AP in the centralized system 104 and/or the distributed system 106. For example, an AP role can include a centralized role and/or a distributed role. The AP role can also describe a role within the centralized system 104 and/or the distributed system 106. The AP 118-1 can be assigned a distributed role and a relay role to deploy the AP 118-1 to the distributed system 106 as a relay base station, among other examples.

For example, the controllers 108 can receive a request for an AP role from the AP 118-1. The request can include properties (e.g., data) associated with the AP 118-1. For example, the request can include an ID of the AP 118-1, an IP address of the AP 118-1, a MAC address of the AP 118-1, and/or a group association of the AP 118-1, among other possible types of properties associated with the AP 118-1. The AP 118-1 can provide a property or multiple properties associated with the AP 118-1 if it is not known the type of data that the controllers 108 utilize to generate the AP role.

In some examples, the AP 118-1 can retain the property of the AP 118-1 until the controllers 108 request the property of the AP 118-1. The AP 118-1 can request an AP role. The controllers 108, responsive to receiving the request, can acknowledge the request and/or request a property or multiple properties associated with the AP 118-1. For example, the controllers 108 can request a MAC address of the AP 118-1.

Upon receiving the properties of the AP 118-1, the controllers 108 can retrieve the deployment policy 116. In some examples as shown in FIG. 1, the deployment policy 116 can be stored in a database 114. The deployment policy 116 can also be stored in memory of the servers 102 and/or the controllers 108 without the use of a database.

Each of the controllers 108 can host a database (DB) 114. The database 114 can host the deployment policy 116. In some examples, the DB 114 and/or the deployment policy 116 can be a same DB and deployment policy. In other examples, the DB 114 and/or the deployment policy 116 can be different DB's and/or deployment policies. For example, the master controller 108-1 can host a first deployment policy, the mobility controller 108-2 can host a second deployment policy and the cloud-based controller 108-3 can host a third policy. Each of the first deployment policy, the second deployment policy, and/or the third deployment policy can be maintained independently of the other deployment policies. In some examples, each of the first, the second, and/or the third deployment policies can be utilized in the network 100.

The controllers 108 can utilize the properties of the AP 118-1 to determine an AP role. The controllers 108 can compare a property of the AP 118-1 to a corresponding a range or multiple ranges of property values defined by the deployment policy 116. For example, the deployment policy 118-1 can define a first range of MAC addresses and a second range of MAC addresses, the first range of MAC addresses being associated with the centralized system 104 while the second range of MAC addresses are associated with the distributed system 106. The controllers 108 can compare a MAC address of the AP 118-1 to the first range of MAC addresses and/or a second range of MAC addresses. The controllers 108 can determine that the MAC address of the AP 118-1 is in the first range of MAC addresses defined by the deployment policy 116.

Based on the comparison of the property of the AP 118-1 to the multiple ranges of property values, the controllers 108 can associate the property of the AP 118-1 with a range of the property values. For examples, the controllers 108 can associate the MAC address with the first range of property values. The controllers 108 can also associate the property of the AP 118-1 with one of the systems comprising the network 100. That is, the controllers 108 can associate the MAC address of the AP 118-1 with the centralized system 104. Based on the association of the property of the AP 118-1 to a system of the network 100, the controllers 108 can associated the AP 118-1 with the system of the network 100. For example, the controllers 108 can associate the AP 118-1 with the centralized system 104. The controllers 108 can assign an AP role based on the association between the system of the network 100 and the AP 118-1. The controller 108 can assign a centralized role to the AP 118-1 based on the association between the centralized system 104 and the AP 118-1.

Upon receiving the AP role, the AP 118-1 can set an internal flag to indicate that future restarts of the AP 118-1 can include a new request for an AP role. For example, if a flag internal to the AP 118-1 is set, then upon reinitiating the AP 118-1 the AP 118-1 can set the features associated with the AP role previously assigned. Similarly, the AP 118-1 can store the AP role that is assigned by the controllers 108. The flag can comprise a plurality of bits stored in a plurality of memory cells and/or registers in the APs 118. Setting the flag can include storing a first predefined value in the memory cells and/or registers associated with the flag. Resetting the flag can include storing a second predefined value in the memory cells and/or the registers associated with the flag.

In some examples, the AP role can be assigned to the AP 118-1 using more or less associations than the associations describe herein. For example, the controllers 108 can compare the property(s) of the AP 118-1 to the range(s) of property values to identify a range of values. Based on the identification of the range of values, the controllers 108 can select a corresponding system of the network 100. Based on the selection, the controllers 108 can select a corresponding AP role which can be assigned to the AP 118. For example, the controller 108 can then access an AP role associated with the centralized system 104 and provide the accessed AP role to the AP 118-1.

The controllers 108 can receive the request for the AP role and a corresponding property of the AP 118-1. The controllers 108 can retrieve the deployment policy and determine that the property of the AP 118-1 is not included in a ranges of corresponding property values.

The controllers 108 can reply to the request describing that an AP role is not determined based on the provided property. The AP 118-1 can determine whether to provide a different property or assume a default role. For example, a default role can be a centralized role. The AP 118-1 can self-assign the centralized role based on receiving a message describing that an AP role was not assigned and/or based on a message describing that the property is not included in the range of corresponding property values. The AP 118-1 can also provide a different property to the controllers 108 and wait for an AP role. The AP 118-1 can provide a predetermined quantity of properties to the controllers 108 before assuming a role or throwing an exception.

Responsive to not receiving an AP role after providing a property to one of the controllers 108, the AP 118-1 can also provide the property and/or a different property to a different one of the controllers 108-2. For example, responsive to not receiving an AP role after providing a first property to the mobility controller 108-2, the AP 118-1 can provide the first property and/or a second property of the AP 118-1 to the master controllers 108-1 and/or the cloud-based controller 108-3.

In some examples, the AP 118-1 can provide multiple properties to the controllers 108. For examples, the AP 118-1 can provide a first property and a second property to the controllers 108. The controllers 108 can determine that a portion of the provided properties are within a range of property values and that a second portion of the provided properties are not within the range or properties. For example, the controllers 108 can determine that the first property of the AP 118-1 is within a range of property values associated with the first property. The controllers 108 can determine that the second property of the AP 118-1 are not within a range of property values associated with the second property. In some examples, the controllers 108 can determine not to provide an AP role based on determining that the second property is not within a range of property values associated with the second property. In other examples, the controllers 108 can provide an AP role based on determining that the first property is within a range of property values associated with the first property.

The controllers 108 can also assign an AP role based on whether the properties are within a plurality of ranges of property values and/or based on whether the properties are not within a plurality of ranges of property values. For example, the controllers 108 can determine that the first property is not within a first range of property values and can determine that the second property is within a second range of property values. The controllers 108 can assign an AP role based on the exclusion of the first property from the first range of property values and the inclusion of the first property from the second range of property values. That is, the controllers 108 can assign an AP role or decide not to assign an AP role based on the combination of properties included in ranges of property values and based on the combination of properties not included in ranges of property values.

The specific mapping between the inclusions and exclusions of properties in the property values and AP roles can be defined by the controllers 108 and/or by the deployment policy 116. For example, the deployment policy 116 can define that if the AP 118-1 comprises property values that are included in second rage of property values and not included in the first range of property values, then the AP 118-1 is to be assigned to the distributed system 106.

In some examples, the deployment policy 116 can be updated without modifying the network environment. The deployment policy 116 can be updated without changing a pointer stored in the servers 107. In some examples, the deployment policy 116 can be updated without modifying the controllers 108 as described in association with FIG. 3.

In some examples, upon a modification of the deployment policy 116, the controllers 108 can provide a notification of the updated deployment policy 116 to the APs 118. The APs 118 can then reset their associated flags and request a new AP role as previously defined. The APs 118 can also reset their flags and restart themselves. Upon restarting, the APs 118 can determine that their flags are not set and can request an AP role from the controllers 108. The controllers 108 can then assign AP roles based on the updated deployment policy 116. In other examples, upon a modification of the deployment policy 116, the controllers 108 can reassign AP roles to the APs 118 without waiting for a request for an AP role.

Figure 2:
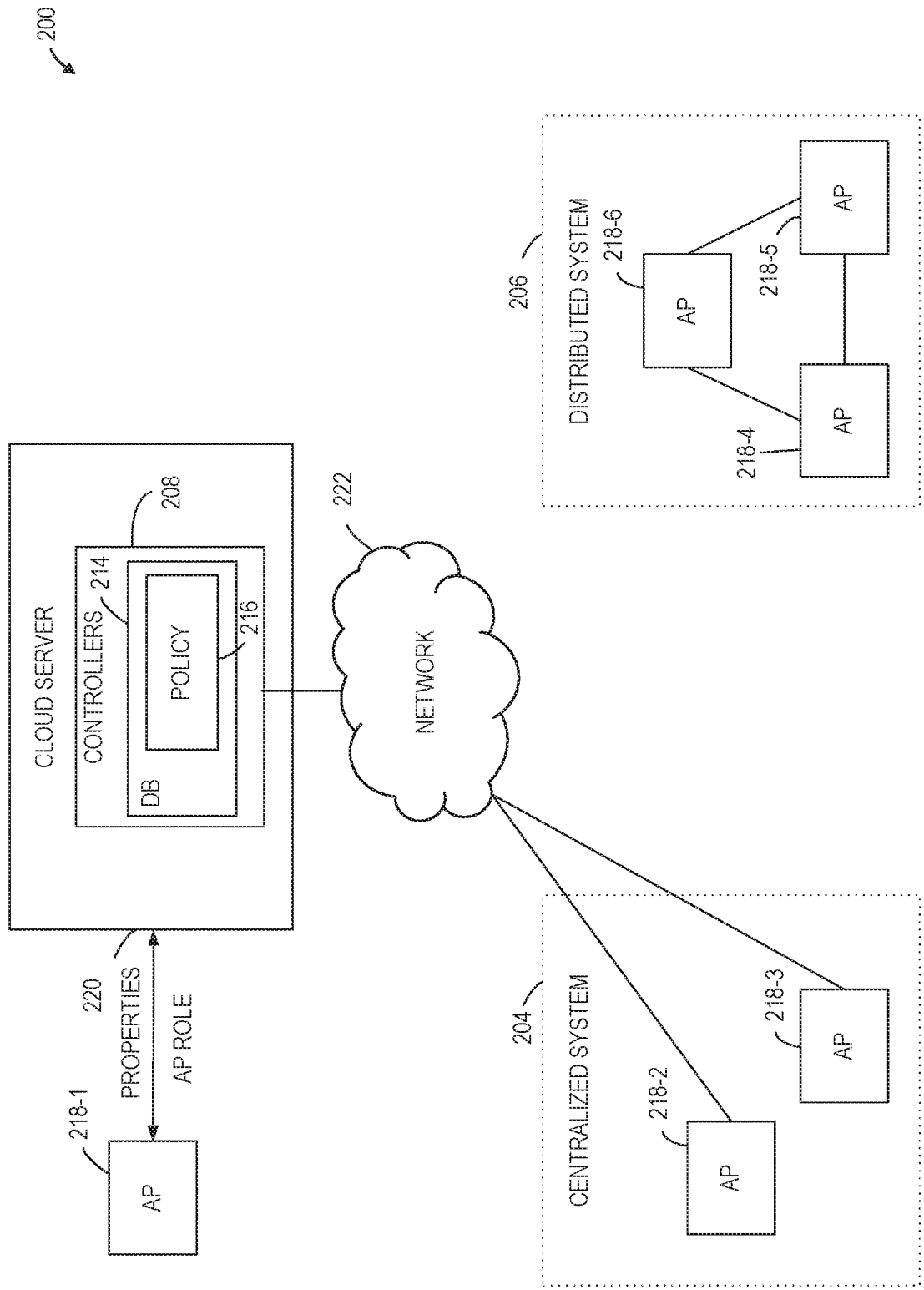
FIG. 2 illustrates an example of a network for deploying an AP consistent with the disclosure.

FIG. 2 illustrates an example of a network 200 for deploying an AP 218-1 consistent with the disclosure. The network 200 includes a centralized system 204 and a distributed system 206. The centralized system 204 can include APs 218-2 and 218-3. The distributed system 206 can include APs 218-4 to 218-6. In some examples, a cloud server 220 can be part of the network 200. In other examples, the cloud server 220 can be external to the network 200.

The cloud server 220 can include shared resources provided by a cloud service provider. The cloud server 220 can be accessed through a network 222. The network 222 can be a LAN or a wide area network (WAN) that is independent or different from the network 200.

The cloud server 220 can include controllers 208 which are analogous to controllers 108 in FIG. 1. The controllers 208 can represent a master controller, a mobility controller, and/or a cloud-based controller. Each of the controllers 208 can include a DB 214 and a deployment policy 216.

A plurality of servers (e.g., the servers 107 in FIG. 1) can provide a pointer to the cloud server 220 and/or the controllers. The AP 218-1 can request an AP role from the controllers 208. The controllers 208 can provide the AP role as previously described in FIG. 1.

Figure 3:
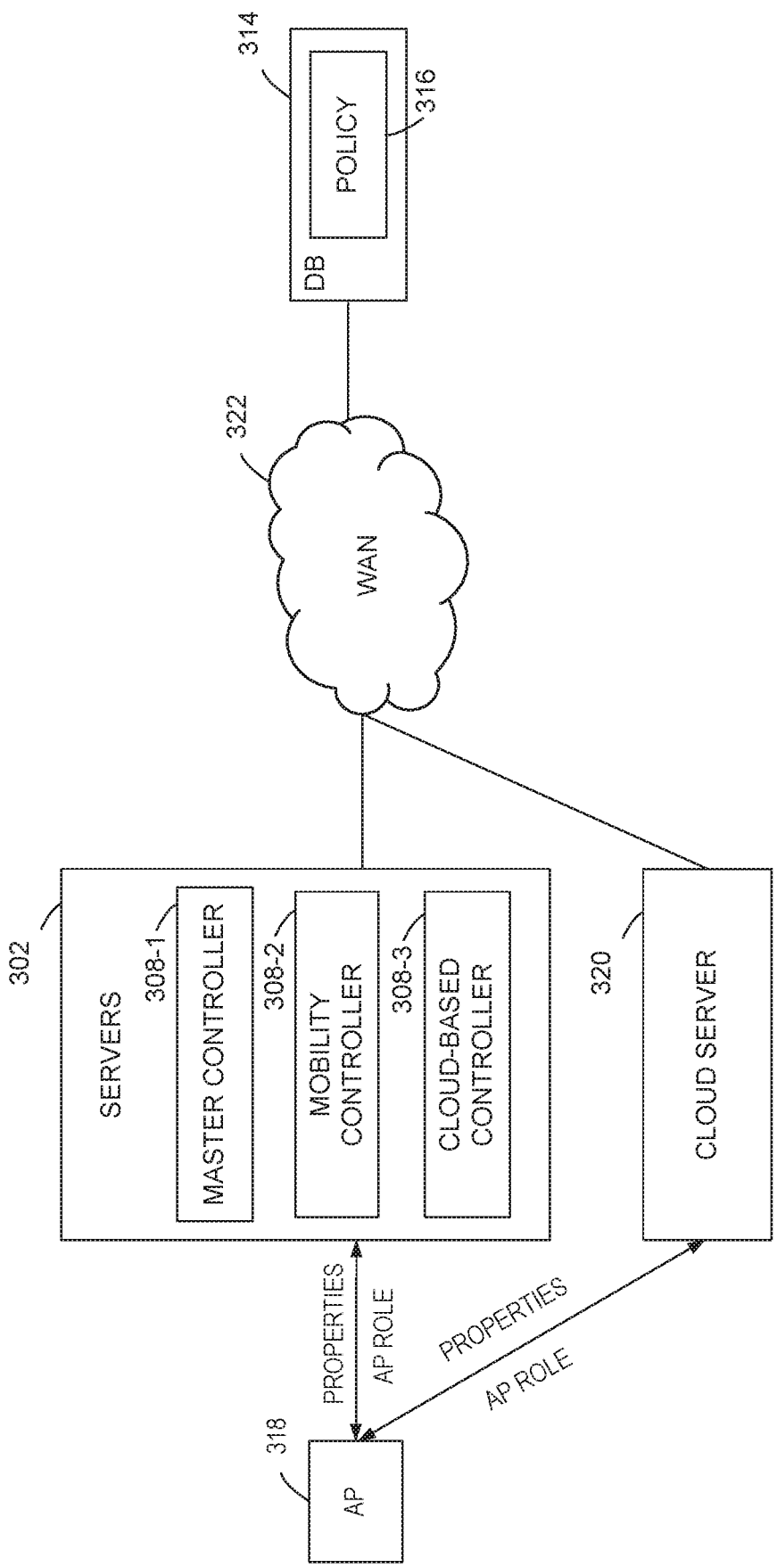
FIG. 3 illustrates an example a network for deploying an AP consistent with the disclosure.

FIG. 3 illustrates an example a network for deploying an AP consistent with the disclosure. The network can include servers 302 and/or a cloud server 320, which are analogous to servers 102 and cloud server 220 in FIGS. 1 and 2, respectively. FIG. 3 also includes an AP 318. FIG. 3 shows the deployment policy 316 as being stored externally from the servers 302 and the cloud servers 320.

The servers 302 include can include a master controller 308-1, a mobility controller 308-2, and/or a cloud-based controller 308-3 which are analogous to the master controller 108-1, the mobility controller 108-2, and/or the cloud-based controller 108-3 in FIG. 1, respectively. The master controller 308-1, the mobility controller 308-2, and the cloud-based controller 308-3 can be referred to collectively as the controllers 308. In some examples, the cloud server 320 may not be part of a network comprising APs 118, the centralized system 104, and the distributed system 206 as shown in FIG. 1

Although not shown for ease of reference, the cloud server 320 can also include the mobility controller 308-1, the mobility controller 308-2, and/or the cloud-based controller 308-3. As such, references to the controllers 308 in the servers 302 can also include references to the controllers that are part of the cloud server 320.

FIG. 3 also shows a WAN 322. The WAN can be independent and separate from the network comprising at least the servers 302. The servers 302 can be coupled to the WAN 322 to access a DB 314 and a deployment policy 316. The WAN can be an example of the network 222 shown in FIG. 2.

FIG. 1 shows the deployment policy 116 and the DB 114 as being local to the network comprising the servers 102. FIG. 3 shows the DM 314 and the deployment policy 316 as being external to the network comprising the servers 302. Although not shown the DB 314 and the deployment policy 316 can be hosted by a plurality of computing devices that are connected to the network 322. Decoupling the DB 314 and/or the deployment policy 316 from the controllers 308 can provide the ability to modify the DB 314 and/or the deployment policy 316 without altering a network environment, the servers 302 and/or the controllers 308. That is, the DB 314 and/or the deployment policy 316 can be modified, edited, and/or replaces without making changes to a network environment associated with the serves 302, without making changes to the servers 302, and/or without making changes to the controllers 308.

The deployment policy 316 can be modified by, for example, modifying a range of properties of the APs. The deployment policy 316 can also be modified by modifying a mapping between the ranges of properties and a plurality of systems of the network comprising the servers 302 (e.g., centralized system 204 and/or the distributed system 206).

In some examples, the deployment policy 316 can be deleted and a new deployment policy can be saved in its place using the DB 314 without further modification of the servers 302, the controllers 308, and/or the cloud server 320. For example, the controllers 308 and/or the cloud server 320 can maintain a pointer to the DB 314 and/or the deployment policy 316. The pointer can include an address of the DB 314 and/or the deployment policy 316. The pointer can include credentials to access the deployment policy 316 via the DB 314. The deployment policy 316 can be deleted, rewritten, and/or modified without replacing the pointer stored in the controllers 308 and/or the cloud server 320.

The AP 318 can provide properties to the servers 302 and/or the cloud servers 320. The servers 302 and/or the cloud servers 320 can retrieve and/or access the deployment policy 316 from the DB 314 which is hosted externally from the servers 302 and/or the cloud servers 320. The servers 302 and/or the cloud servers 320 can return an AP role using the deployment policy 316 and the properties as previously described.

Figure 4:
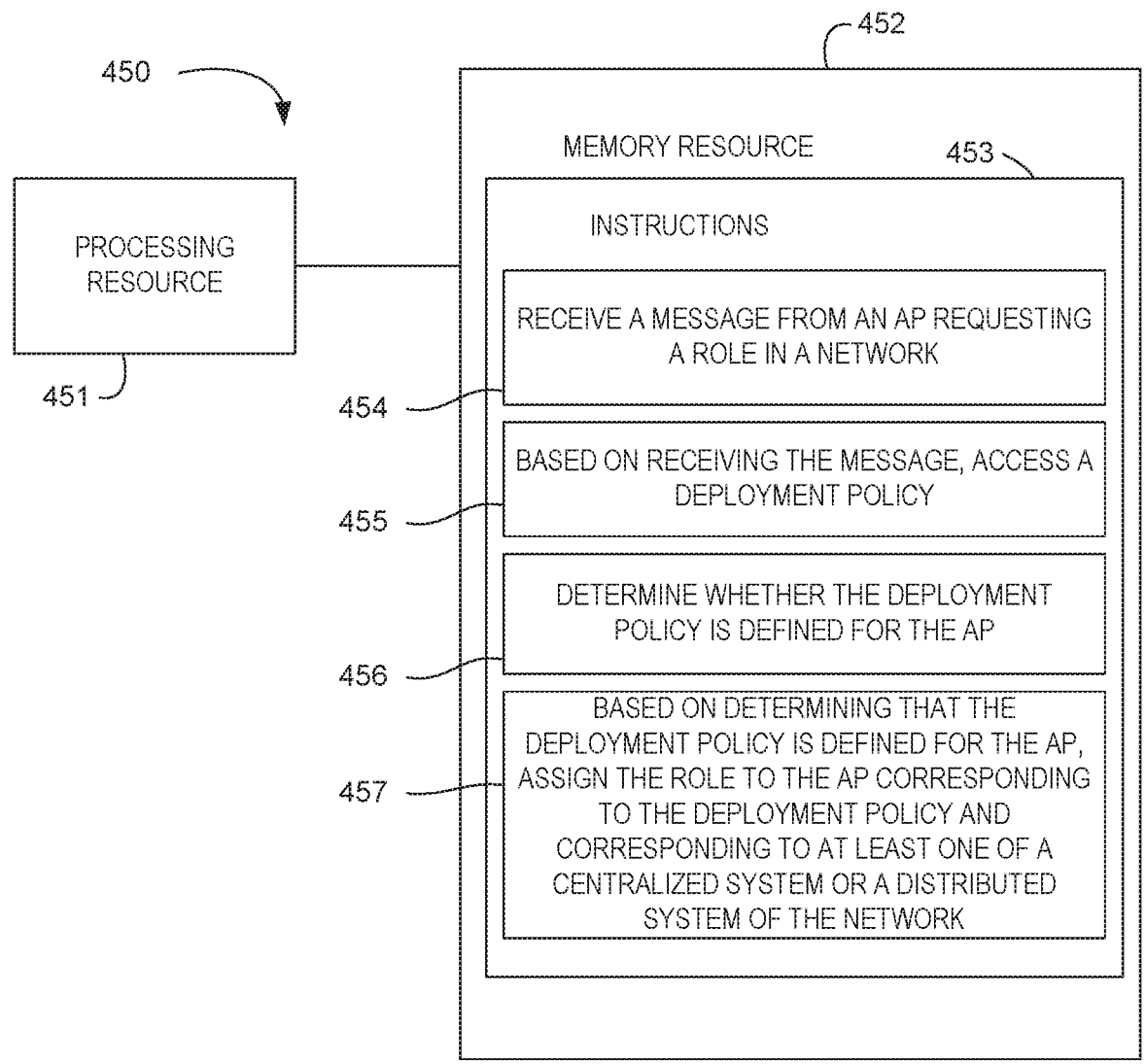
FIG. 4 illustrates an example of an apparatus for deploying an AP consistent with the disclosure.

FIG. 4 illustrates an example of an apparatus 450 for deploying an AP consistent with the disclosure. As shown in FIG. 4, the apparatus 450 includes a processing resource 451 and a memory resource 452.

The processing resource 451 may be a hardware processing unit such as a microprocessor, application specific instruction set processor, coprocessor, network processor, or similar hardware circuitry that can cause machine-readable instructions to be executed. In some examples, the processing resource 451 may be a plurality of hardware processing units that can cause machine-readable instructions to be executed. The processing resource 451 can include central processing units (CPUs) and/or graphics processing units (GPUs), among other types of processing units. The memory resource 452 may be any type of volatile or non-volatile memory or storage, such as random access memory (RAM), flash memory, read-only memory (ROM), storage volumes, a hard disk, or a combination thereof.

The memory resource 452 may store instructions 453 thereon. When executed by the processing resource 451, the instructions 453 may cause the apparatus 450 to perform specific tasks and/or functions. For example, at block 454, the memory resource 452 may store instructions 453 which may be executed by the processing resource 451 to cause the apparatus 450 to receive a message from an AP requesting a role (e.g., AP role) in a network. At block 455, the memory resource 452 may store instructions 453 which may be executed by the processing resource 451 to cause the apparatus 450, based on receiving the message, to access a deployment policy. At block 456, the memory resource 452 may store instructions 453 which may be executed by the processing resource 451 to cause the apparatus 450 to determine whether the deployment policy is defined for the AP. At block 457, the memory resource 452 may store instructions 453 which may be executed by the processing resource 451 to cause the apparatus 450, based on determining that the deployment policy is defined for the AP, to assign the role to the AP corresponding to the deployment policy and corresponding to at least one of a centralized system or a distributed system of the network.

Determining whether the deployment policy is defined for the AP can include determining whether a property of the AP is incorporated in a range of property values defined in the deployment policy. That is, a determination of whether the deployment policy is defined for the AP can be based on a property of the AP. The properties of the AP can include an IP address of the AP, a MAC address of the AP, and/or a group associated with the AP. An AP can be associated with a group if the AP is part of the group, among other possible associations with a group.

In some examples, a controller can determine that the deployment policy is not defined for the AP. The controller can refrain from assigning the role to the AP based on determining that the deployment policy is not defined for the AP. The AP can assume a role based on not being issued a role by the controller. In some examples, the AP can assume a default or predetermined role. The AP can include a controller-based mode and a controller-less mode. In a controller-less mode, the AP can function as a controller-less AP. In a controller-based mode, the AP can function as a controller-based AP.

Figure 5:
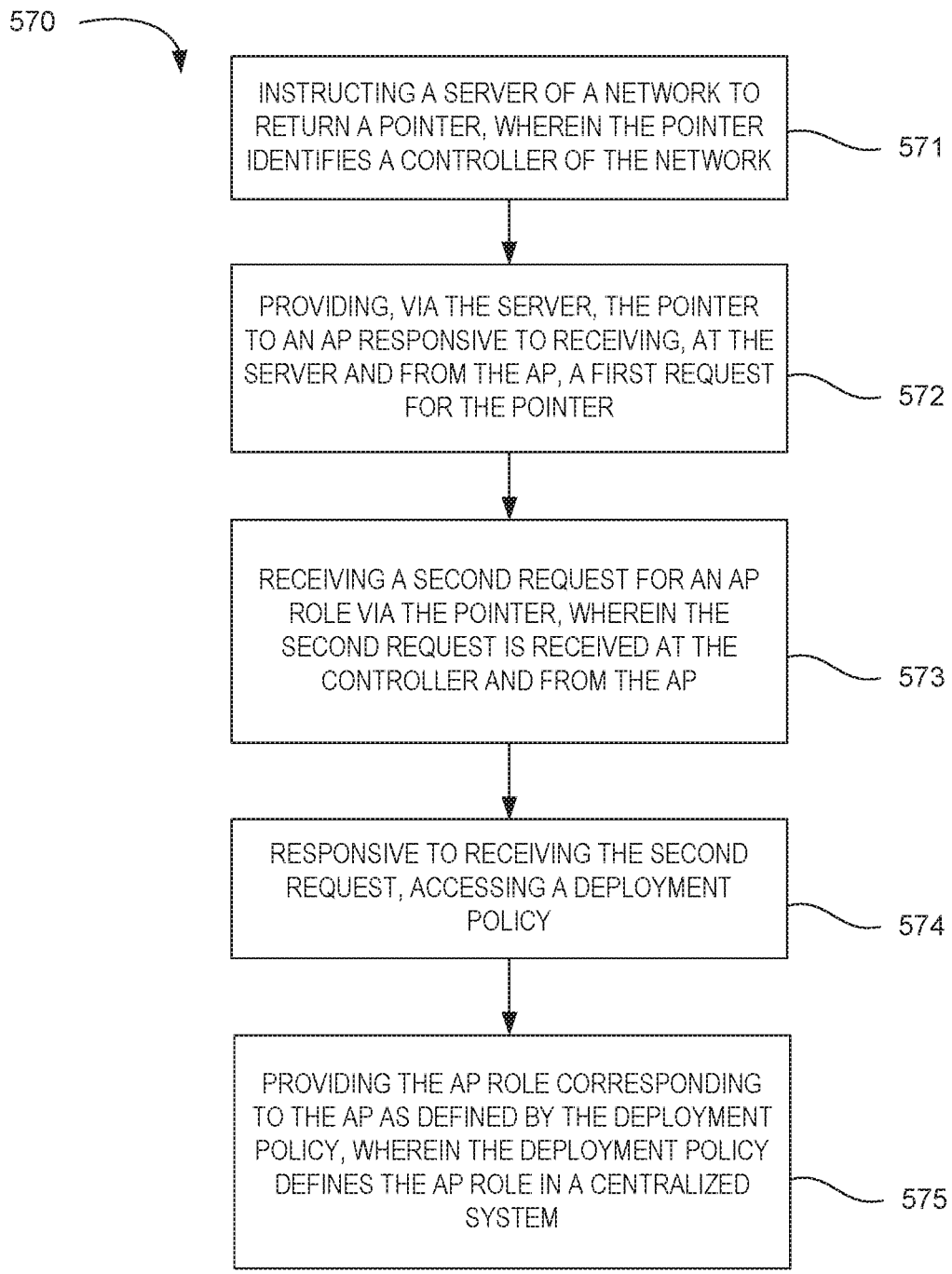
FIG. 5 illustrates an example flow diagram of a method for deploying an AP consistent with the disclosure.

FIG. 5 illustrates an example flow diagram of a method 570 for deploying an AP consistent with the disclosure. At block 571, the method 570 includes instructing a server of a network to return a pointer, wherein the pointer identifies a controller of the network. At block 572, the method 570 includes providing, via the server, the pointer to an AP responsive to receiving, at the server and from the AP, a first request for the pointer. At block 573, the method 570 includes receiving a second request for an AP role via the pointer, wherein the second request is received at the controller and from the AP. At block 574, the method 570 includes, responsive to receiving the second request, accessing a deployment policy. At block 575, the method includes providing the AP role corresponding to the AP as defined by the deployment policy, wherein the deployment policy defines the AP role in a centralized system.

In some examples, the controller can be a cloud server and/or can be hosted by a cloud server to manage the centralized system. The controller can be a master controller. The master controller can manage the centralized system via a virtual appliance.

The server providing the pointer can be a DHCP server to return an option 60 and/or an option 43 pointing to an address of the controller. The server can comprise an environment of the network.

In some examples, the deployment can be stored locally to the controller. The controller and the deployment can be hosted by a same server and/or by a different server within the network that is comprised of the controller.

In other examples, the deployment policy can be external to the controller and/or the network. For examples, the deployment policy can be stored in a computing device that is coupled to the controller via a WAN such as the world wide web.

The deployment policy can be hosted by a database. The deployment policy and/or the database can be external to the controller and/or the network comprised of the controller.

Figure 6:
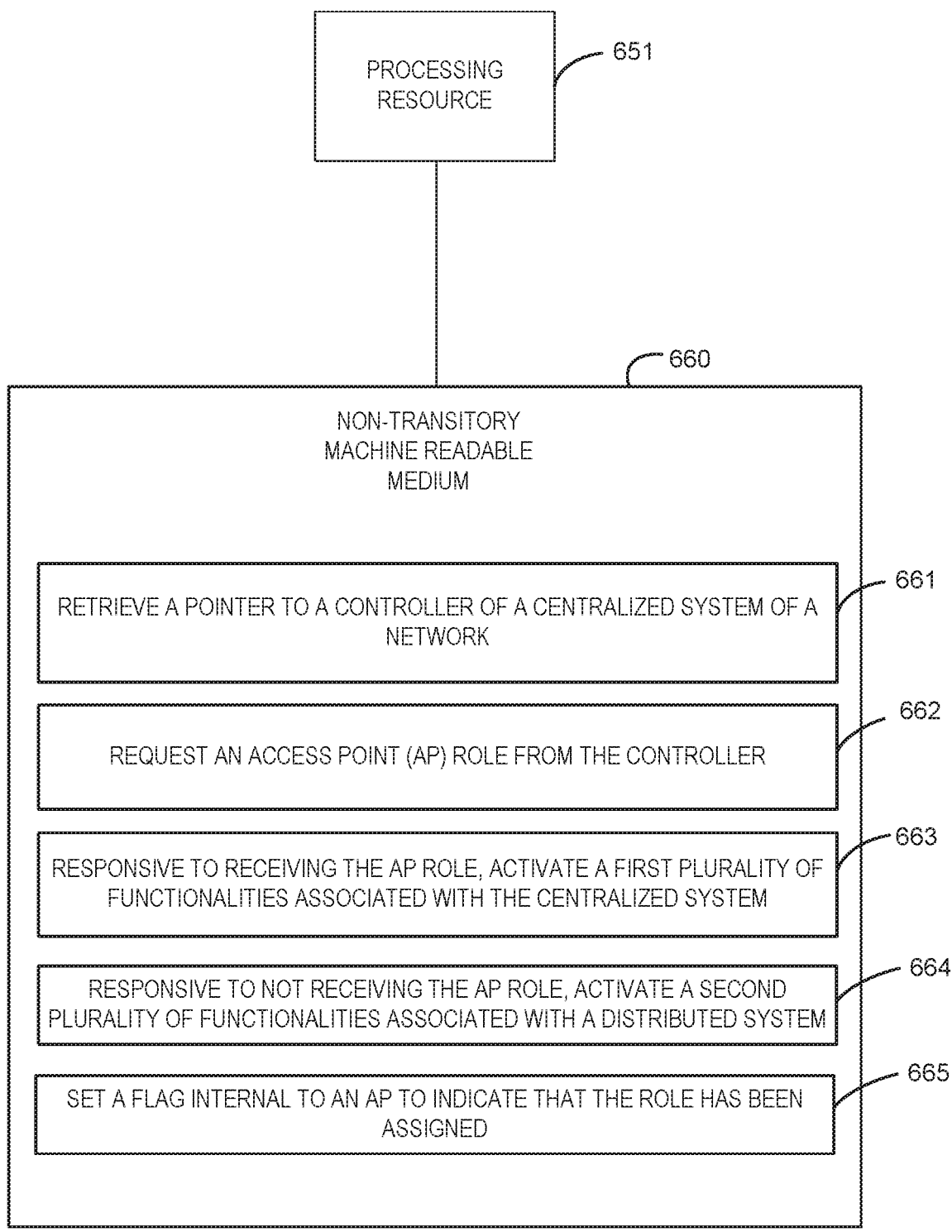
FIG. 6 illustrates an example non-transitory machine-readable medium for deploying an AP consistent with the disclosure.

FIG. 6 illustrates an example non-transitory machine-readable medium 660 for deploying an AP consistent with the disclosure. A processing resource 651 may execute instructions stored on the non-transitory machine readable medium 660. The non-transitory machine readable medium 660 may be any type of volatile or non-volatile memory or storage, such as random access memory (RAM), flash memory, read-only memory (ROM), storage volumes, a hard disk, or a combination thereof.

The example medium 660 stores instructions 661 executable by a processing resource 651 to retrieve a pointer to a controller of a centralized system of a network. The example medium 660 stores instructions 662 executable by a processing resource 651 to request an AP role from the controller. The example medium 660 stores instructions 663 executable by the processing resource 651 to, responsive to receiving the AP role, activate a first plurality of functionalities associated with the centralized system. The example medium 660 stores instructions 664 executable by the processing resource 651 to, responsive to not receiving the AP role, activate a second plurality of functionalities associated with a distribution system. The example medium 660 stores instructions 665 executable by the processing resource 651 to set a flag internal to an AP to indicate that the role has been assigned.

The example medium 660 can also comprise instructions to receive a new role from the controller. Responsive to determining that the plurality of functionalities are activated at instructions 663 and/or responsive to receiving the new role, the first plurality of functionalities can be deactivated. Responsive to deactivating the first plurality of functionalities, the second plurality of functionalities can be activated.

The example medium 660 can also comprise instructions to receive a new role new AP role from the controller. Responsive to determining that the second plurality of functionalities are activated at instructions 664 and/or based on receiving the new AP role, the second plurality of functionalities can be deactivated. Responsive to deactivating the second plurality of functionalities, the first plurality of functionalities can be activated.

In some examples, the AP may not receive a new AP role but instead can receive an indication of a new AP role from the controller. That is, the controller can provide a message and not a new AP role indicating that a new AP role is available for the AP. Based on receiving the indication of the new AP role, the AP can reset the flag and restart itself to retrieve the new AO role from the controller as previously described.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. An apparatus comprising:
   a memory; and
   a processor to execute instructions stored in the memory, the instructions including instructions to:
   receive a message from an access point (AP) requesting a role in a network, wherein the network is a mixed network including both a centralized system with a central server and a distributed system without a central server;
   based on receiving the message, access a deployment policy, the deployment policy including a mapping between properties of APs and the systems of the network;
   determine whether the deployment policy is defined for the AP; and
   upon determining that the deployment policy is defined for the AP, assign a first role to the AP corresponding to the deployment policy based upon a combination of a first one or more properties of the AP falling within a corresponding first range of property values and a second one or more properties of the AP falling outside of a corresponding second range of property values, the first role corresponding to at least one of the centralized system or the distributed system of the network;
   wherein, upon determining that the first role corresponds to the distributed system, the assigned first role comprises one of a main base station, a relay base station, and a remote base station.

2. The apparatus of claim 1, wherein at least one of the first one or more properties or the second one or more properties include an internet protocol (IP) address of the AP.

3. The apparatus of claim 1, wherein at least one of the first one or more properties or the second one or more properties include a media access control (MAC) address of the AP.

4. The apparatus of claim 1, wherein at least one of the first one or more properties or the second one or more properties include a group associated with the AP.

5. The apparatus of claim 1, wherein the processor further executes instructions to, based on determining that the deployment policy is not defined for the AP, refrain from assigning the role to the AP.

6. The apparatus of claim 5, wherein the processor further executes instructions to:
   provide notice to the AP that a role has not been assigned for the AP.

7. The apparatus of claim 1, wherein the processor further executes instructions to:
   upon the deployment policy being updated, provide notice to the AP regarding the updated deployment policy.

8. The apparatus of claim 7, wherein the processor further executes instructions to:
   receive a request from the AP for a new role in response to the notice sent to the AP regarding the updated deployment policy; and
   assign a second role to the AP corresponding to the updated deployment policy.

* * * * *